(12) United States Patent
Beaumont et al.

(10) Patent No.: US 6,904,216 B2
(45) Date of Patent: Jun. 7, 2005

(54) OPTICAL FIBER OF COMPLEX INDEX PROFILE

(75) Inventors: Florent Beaumont, Conflans Ste Honorine (FR); Maxime Gorlier, Paris (FR); Pierre Sillard, Le Chesnay (FR); Ludovic Fleury, Bois D'Arcy (FR); Louis-Anne de Montmorillon, Paris (FR); Pascale Nouchi, Maisons-Lafitte (FR)

(73) Assignee: Alcatel, Paris (FR)

( * ) Notice: Subject to any disclaimer, the term of this patent is extended or adjusted under 35 U.S.C. 154(b) by 116 days.

(21) Appl. No.: 10/340,689

(22) Filed: Jan. 13, 2003

(65) Prior Publication Data

US 2003/0180020 A1 Sep. 25, 2003

(30) Foreign Application Priority Data

Jan. 14, 2002 (FR) .......................................... 02 00379

(51) Int. Cl.$^7$ ................................................. G02B 6/22
(52) U.S. Cl. ...................................................... 385/127
(58) Field of Search ................................. 385/123, 124, 385/126, 127

(56) References Cited

U.S. PATENT DOCUMENTS 6,360,046 B1 * 3/2002 Sasaoka et al. ............. 385/124
6,751,389 B2 * 6/2004 Tirloni ....................... 385/127

FOREIGN PATENT DOCUMENTS

| EP | 0984309 A1 | 3/2000 |
| EP | 1028329 A1 | 8/2000 |
| WO | WO 9908142 | 2/1999 |
| WO | WO 0017680 | 3/2000 |
| WO | WO 0065387 | 11/2000 |

OTHER PUBLICATIONS

A. V. Belov, "Profile Structure of Single–Mode Fibers With Low Nonlinear Properties for Long–Haul Communication Lines", Optics Communications, North–Holland Publishing Co., Amsterdam, NL, vol. 161, No. 4–6, Mar. 15, 1999, pp. 212–216, XP004163351.

A. Safaai–Jazi et al, "New Designs for Dispersion–Shifted and Dispsersion–Flattened Fibers", Proceedings of the SPIE, Bellingham, VA, US, vol. 1176, Sep. 5, 1989, XP000674818.

* cited by examiner

*Primary Examiner*—Frank G. Font
*Assistant Examiner*—Michael P. Mooney
(74) *Attorney, Agent, or Firm*—Sughrue Mion, PLLC

(57) ABSTRACT

The invention proposes an optical fiber presenting a reference index profile having more than six steps. At a wavelength of 1550 nm it presents chromatic dispersion that is positive, and a ratio of the square of effective area over chromatic dispersion slope that is greater than 100,000 $\mu m^4 \cdot nm^2 \cdot km/ps$. The invention makes it possible to improve the propagation characteristics of prior art fibers by optimizing index profile. It can be implemented using conventional techniques for building up preforms by VAD or by MCVD.

6 Claims, 2 Drawing Sheets

OPTICAL FIBER OF COMPLEX INDEX PROFILE

Figure 1:
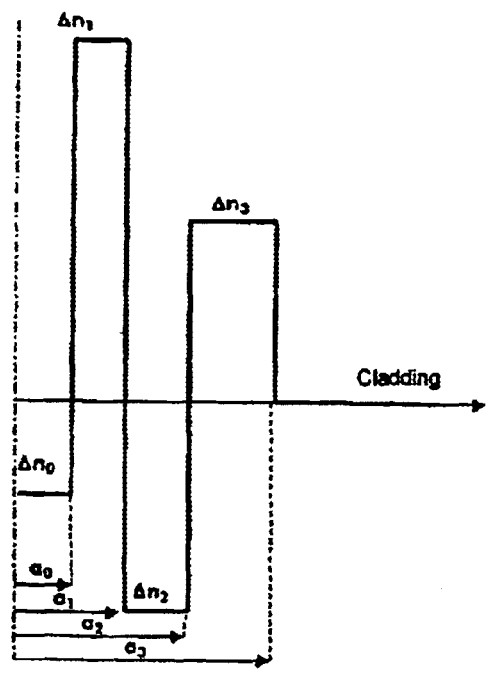

The present invention relates to the field of optical fiber transmission, and more specifically to the characteristics of optical fibers used in transmission systems.

For optical fibers, the index profile is generally described as a function of the appearance of a graph plotting the refractive index of the fiber as a function of radius. The distance r to the center of the fiber is conventionally plotted along the abscissa axis, and the difference between the refractive index and the refractive index of the fiber cladding is plotted up the ordinate axis. An index profile can thus be said to be "stepped", "trapezium-shaped", or "triangular" for graphs respectively in the form of a step, a trapezium, or a triangle. Such curves are generally representative of an ideal or reference profile for the fiber, and manufacturing constraints can lead to a fiber having a profile that is perceptibly different. The term index "step" is used below to designate a level portion of the reference profile—and thus a portion of the fiber which is disk- or ring-shaped—and within which the index presents a value that is substantially constant.

In novel high data rate and wavelength division multiplex (WDM) transmission networks, it is advantageous to manage chromatic dispersion, and in particular for data rates greater than or equal to 40 gigabits per second (Gbit/s) or 160 Gbit/s; the idea is to ensure that for all wavelengths of the multiplex, the chromatic dispersion accumulated over a link should be substantially zero, so as to limit pulse broadening. In general, an accumulated value for dispersion of a few tens of picoseconds per nanometer (ps/nm) is acceptable. It is also advantageous to limit the accumulated chromatic dispersion slope over the wavelength range of the multiplex so as to avoid or limit distortion between the channels of the multiplex; this becomes increasingly important with increasing number of channels. Dispersion slope is conventionally the derivative of chromatic dispersion relative to wavelength. Finally, account must also be taken of the fact that the amplitude of non-linear effects in a fiber is inversely proportional to the effective area of the fiber. The effective area should therefore ideally be selected to be as large as possible in order to limit non-linear effects. Nevertheless, certain non-linear effects, such as the Raman effect, are useful in improving the margins of transmission systems.

It is conventional for the line fiber in an optical fiber transmission system to be constituted by a step-index fiber, also known as a single mode fiber (SMF). Thus, the Applicant sells a step-index single mode fiber under the reference Alcatel 6900 which presents a wavelength $\lambda_0$ at which chromatic dispersion is zero in the range 1300 nanometers (nm) to 1320 nm, and chromatic dispersion that is less than or equal to 3.5 picoseconds per nanometer kilometer (ps/(nm.km)) over a range of 1285 nm to 1330 nm, and that is equal to about 17 ps/(nm.km) at 1550 nm. Its chromatic dispersion slope at 1550 nm is about 0.06 ps/(nm².km). That fiber typically presents a ratio C/C' of chromatic dispersion over chromatic dispersion slope lying in the range 250 nm to 370 nm at 1550 nm. The effective area of that fiber at 1550 nm is close to 80 square micrometers ($\mu m^2$). For such a fiber, at a wavelength of 1550 nm, the ratio of the square of the effective area over the chromatic dispersion slope is about 107,000 $\mu m^4.nm^2.km/ps$. Such a fiber presents a profile that is simple, having a single step; it presents an index profile with a central portion of index that is substantially constant and greater than the index of the cladding.

Dispersion shifted fibers (DSF) have also appeared on the market. A DSF presenting positive non-zero chromatic dispersion at the wavelengths at which it is used, typically around 1550 nm, is referred to by the abbreviation NZ-DSF+. Such fibers present chromatic dispersion at said wavelengths that is low, typically chromatic dispersion of less than 11 ps/(nm.km) at 1550 nm, and chromatic dispersion slope lying in the range 0.04 ps/(nm².km) to 0.01 ps/(nm².km). Profiles that such fibers might present include profiles having three steps, with a trapezium-shaped or rectangular-shaped central portion surrounded by a depressed trench and by a ring; profiles having four steps are also known (also known as "quadruple clad" profiles), comprising a rectangular central portion surrounded by a first depressed trench, then by a ring, and then by a second depressed trench.

FR-A-99/02028 proposes a line fiber that is particularly adapted to dense wavelength division multiplex (DWDM) transmission with inter-channel spacing of 100 gigahertz (GHz) or less for a data rate per channel of 10 Gbit/s; at a wavelength of 1550 nm, that fiber presents an effective area greater than or equal to 60 $\mu m^2$, chromatic dispersion lying in the range 6 ps/(nm.km) to 10 ps/(nm.km), and chromatic dispersion slope of less than 0.07 ps/(nm².km). The Applicant sells a fiber under the trade name TeraLight, which fiber presents, at 1550 nm, typical chromatic dispersion C of 8 ps/(nm.km) and chromatic dispersion slope C' of 0.058 ps/(nm².km). That fiber presents an effective area $S_{eff}$ of about 65 $\mu m^2$, and a ratio of the square of its effective area over the chromatic dispersion slope which is about 73,000 $\mu m^4.nm^2.km/ps$, at a wavelength of 1550 nm.

FR-A-00/02316 describes an optical fiber which is used as a line fiber and in which chromatic dispersion is compensated by a dispersion-compensating fiber of the kind that is conventionally used with a step index fiber. At a wavelength of 1550 nm, that fiber presents chromatic dispersion lying in the range 5 ps/(nm.km) to 11 ps/(nm.km), a ratio of chromatic dispersion over chromatic dispersion slope lying in the range 250 nm to 370 nm, and an effective area of not less than 50 $\mu m^2$. In that document, it is proposed that the ratio of the square of the effective area over the chromatic dispersion slope should be greater than 80,000 $\mu m^4.nm^2.km/ps$. That ratio is representative of a compromise between effective area—which needs to be as large as possible—and chromatic dispersion slope—which needs to be as small as possible. The fibers proposed in that document present a three-step profile with a rectangular central portion surrounded by a buried portion and by a ring.

WO-A-99/08142 describes a fiber having a high degree of negative chromatic dispersion and presenting a profile that is complex.

It is therefore advantageous to have a fiber that enables transmission to be performed over a bandwidth that is as wide as possible, that presents chromatic dispersion slope that is as small as possible, and that presents surface area that is as large as possible or a ratio of the square of surface area over chromatic dispersion slope that is likewise as large as possible.

More precisely, the invention provides an optical fiber presenting a reference index profile having more than six steps and chromatic dispersion that is positive at a wavelength of 1550 nm.

Advantageously, the fiber presents one or more of the following propagation characteristics, measured at a wavelength of 1550 nm:

a ratio of the square of effective area over chromatic dispersion slope greater than 90,000 $\mu m^4.nm^2.km/ps$;

a ratio of the square of effective area over chromatic dispersion slope greater than 100,000 $\mu m^4.nm^2.km/ps$;

chromatic dispersion slope less than or equal to 0.08 ps/(nm².km); and chromatic dispersion less than or equal to 14 ps/(nm.km).

So far as the profile is concerned, the steps may all present identical thickness; conversely, at least two steps may present a thickness that is different.

The invention also provides a transmission system presenting such a fiber as its line fiber.

Figure 2:
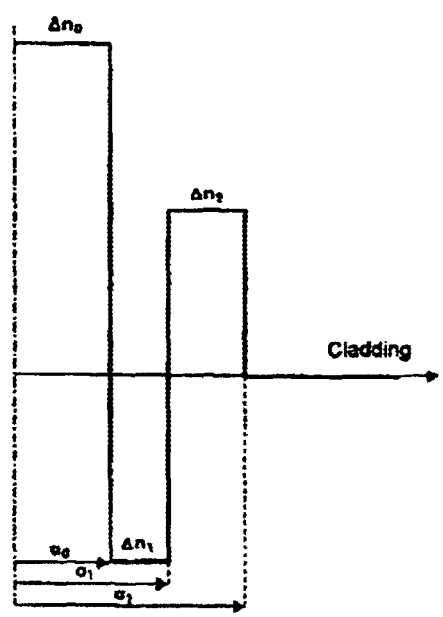
Figure 3:
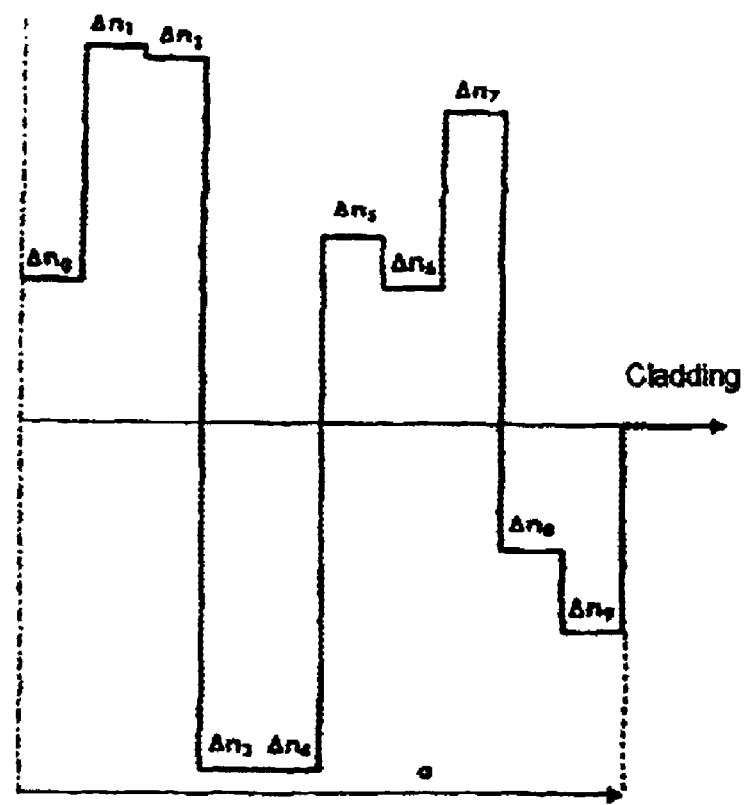

Other characteristics and advantages of the invention appear on reading the following description of embodiments of the invention, given by way of example and with reference to the accompanying drawings, in which:

FIGS. 1 and 2 are diagrams showing the reference index profiles of prior art fibers; and FIG. 3 is a diagram showing the reference index profile of a fiber constituting an embodiment of the invention.

In order to improve the propagation characteristics of prior art fibers, the invention proposes providing a reference index profile that presents a number of steps that is greater than or equal to six. More specifically, compared with prior art fibers, the invention proposes replacing the constant index values in given regions by a plurality of index values over the same region; this increase in the number of discrete index values in the fiber makes it possible to obtain better optical characteristics for the fiber. It is also possible to vary the positions within the fiber of the index steps, in particular as a function of the manufacturing method used.

In the description below, implementations of the invention are given in comparison with three prior art fibers.

In the first example, consideration is given to a prior art dispersion-shifted fiber. This is the fiber of Table 3 and of FIG. 3 in WO-A-00/65387. FIG. 1 shows the reference index profile of that fiber. The index profile is an index profile of the coaxial type having a ring, and starting from the center of the fiber it presents:

a central portion of substantially constant index;

a first annular portion of index greater than the index of the cladding, and also greater than the index of the central portion, these two constituting a fiber having a so-called "coaxial" profile.

Around the first annular portion, the fiber presents a portion of buried index that is less than that of the cladding, followed by a second annular portion of index greater than that of the cladding forming a ring around the coaxial profile. FIG. 1 shows that profile.

In the specification below, $\Delta n_0$ designates the difference between the index of the buried central portion and the index of the fiber cladding, $\Delta n_1$ the difference between the index of the central portion and the index of the fiber cladding, $\Delta n_2$ the difference between the index of the buried trench and the index of the fiber cladding, and $\Delta n_3$ the difference between the index of the ring and the index of the fiber cladding. As explained above, $\Delta n_1$ and $\Delta n_3$ have positive values, whereas $\Delta n_0$ and $\Delta n_2$ have negative values. $a_0$ designates the outside radius of the buried central portion of substantially constant index, $a_1$ the outside radius of the central portion of substantially constant index, $a_2$ the outside radius of the buried trench, and $a_3$ the outside radius of the ring. The prior art fiber of FIG. 1 may present the index values (expressed as a percentage relative to the index of silica) and the radii as given in Table 1 below, using the notation specified above.

TABLE 1

| $a_0$ [μm] | $a_1$ [μm] | $a_2$ [μm] | $a_3$ [μm] | $\Delta n_0$ [%] | $\Delta n_1$ [%] | $\Delta n_2$ [%] | $\Delta n_3$ [%] |
|---|---|---|---|---|---|---|---|
| 1.0 | 4.0 | 6.3 | 7.9 | −0.1 | 0.95 | −0.1 | 0.4 |

With that profile, the fiber of FIG. 1 presents the optical characteristics given in Table 2; $S_{eff}$ designates the effective area, C' the chromatic dispersion slope, $S_{eff}^2/C'$ the ratio of the square of the effective area over the chromatic dispersion slope, $\lambda_0$ the wavelength at which chromatic dispersion is zero, and $2W_{02}$ the mode diameter. These quantities are given in the table below and they have the following units respectively: $\mu m^2$, ps/(nm$^2$.km), $\mu m^4$.nm$^2$.km/ps, nm, and $\mu m$. They are measured at a wavelength of 1550 nm.

TABLE 2

| | $S_{eff}$ [μm$^2$] @ 1550 nm | C [ps/(nm · km)] @ 1550 nm | C' [ps/(nm$^2$ · km)] @ 1550 nm | $S_{eff}^2/C'$ [μm$^4$ · nm$^2$ · km/ps] @ 1550 nm | $\lambda_0$ [nm] | $2W_{02}$ [μm] @ 1550 nm |
|---|---|---|---|---|---|---|
| WO-A-0065387 | 73 | ~4 | 0.073 | 73000 | 1500 | 9.06 |

In the invention, the four index "steps" of that fiber—corresponding respectively to the first buried trench, to the first annular portion, to the second buried trench, and to the ring—are replaced by six or more steps. Table 3 below gives the characteristics of the intended profiles, and Table 4 gives the propagation characteristics, using the same conventions as in Table 2.

TABLE 3

| | a [μm] | $\Delta n_0$ [× 10$^3$] | $\Delta n_1$ [× 10$^3$] | $\Delta n_2$ [× 10$^3$] | $\Delta n_3$ [× 10$^3$] | $\Delta n_4$ [× 10$^3$] | $\Delta n_5$ [× 10$^3$] | $\Delta n_6$ [× 10$^3$] | $\Delta n_7$ [× 10$^3$] | $\Delta n_8$ [× 10$^3$] | $\Delta n_9$ [× 10$^3$] |
|---|---|---|---|---|---|---|---|---|---|---|---|
| 6T | 7.9 | −2.5 | 11.0 | 5.2 | −2.5 | −2.4 | 8.7 | | | | |
| 7T | 7.9 | −2.5 | 6.3 | 12.0 | −1.6 | −2.4 | −2.5 | 10.1 | | | |
| 8T | 7.9 | 2.7 | 3.5 | 12.0 | 3.3 | −2.5 | −2.4 | −2.5 | 12.0 | | |
| 9T | 7.9 | −2.5 | 3.8 | 8.1 | 12.0 | −2.5 | −2.6 | −2.5 | −2.4 | 12.0 | |
| 10T | 7.9 | −2.5 | 0.0 | 8.8 | 10.8 | 5.7 | −2.5 | −2.6 | −2.5 | −2.4 | 12.0 |

In this table, a represents the radius of the core of the fiber, i.e. the radius of the portion of the fiber which extends inside its cladding which is of constant index. The number of steps in the examples of Table 3 vary over the range 6 to 10. Each step is of constant thickness, which thickness is equal to the ratio of the radius of the core a over the number of steps in the example. In all of the examples, the core radius a remains constant, thereby showing clearly the influence of the number of steps. Naturally it would also be possible to modify the radius of the core while also modifying the number of steps. Under such circumstances, the core of the fiber remains defined as the central portion of the fiber in which the index is less than or greater than the index of the cladding. Depending on the example, the core can be defined by at least six steps.

TABLE 4

| | $S_{eff}$ [$\mu m^2$] @ 1550 nm | C [ps/(nm · km)] @ 1550 nm | C' [ps/(nm² · km)] @ 1550 nm | $S_{eff}^2/C'$ [$\mu m^4 \cdot nm^2 \cdot km/ps$] @ 1550 nm | $\lambda_0$ [nm] | $2W_{02}$ [$\mu m$] @ 1550 nm |
|---|---|---|---|---|---|---|
| 6T | 80 | ~5 | 0.069 | 92750 | 1490 | 9.27 |
| 7T | 80 | ~5 | 0.068 | 94120 | 1504 | 9.12 |
| 8T | 78 | ~4 | 0.063 | 96570 | 1470 | 9.26 |
| 9T | 77 | ~4 | 0.061 | 97450 | 1492 | 9.01 |
| 10T | 78 | ~4 | 0.061 | 98460 | 1460 | 9.02 |

The values in Table 4 show that increasing the number of steps makes it possible to optimize the propagation parameters of the fiber. Effective area in all of the examples is greater than in the prior art fiber, whereas chromatic dispersion slope is smaller. Consequently, the ratio of the square of effective area over chromatic dispersion slope is greater. In the examples proposed, this ratio presents values greater than 90,000 $\mu m^4.nm^2.km/ps$, compared with the value of 73,000 $\mu m^4.nm^2.km/ps$ for the prior art fiber. The chromatic dispersion, the wavelength $\lambda_0$ at which chromatic dispersion is zero, and the mode diameter of the fiber remain close to the initial values available in the state of the art.

The examples of Tables 3 and 4 show that increasing the number of steps in the fiber so as to reach six or more steps makes it possible to improve the propagation characteristics of the fiber. It should be observed that on going from six steps to ten, there is an increase in the ratio $S_{eff}^2/C'$ and a decrease in the chromatic dispersion slope. These effects are caused solely by changing the number of steps, since the core radius of the fiber is kept constant for demonstration purposes.

In the second example, the prior art fiber taken into consideration is a zero dispersion fiber (All optical regeneration: key features and application to a 160 Gbit/s (4×40 Gbit/s) long-haul transmission, O. Leclerc et al., LEOS, Vol. 14, No. 4, August 2000). That fiber has a reference index profile of the type shown in FIG. 2. The values for the radii and the indices are given in Table 5 below.

TABLE 5

| $a_0$ [$\mu m$] | $a_1$ [$\mu m$] | $a_2$ [$\mu m$] | $\Delta n_0$ [× 10³] | $\Delta n_1$ [× 10³] | $\Delta n_2$ [× 10³] |
|---|---|---|---|---|---|
| 2.98 | 5.64 | 8.05 | 8.6 | −3.7 | 3.0 |

Table 6 uses the same notation as Tables 2 and 4 and gives the values for the propagation parameters of the prior art fiber; the table also gives the values for chromatic dispersion C in ps/(nm.km), for effective cutoff wavelength $\lambda_{ceff}$ expressed in nm, for the ratio of chromatic dispersion over chromatic dispersion slope expressed in nm, and for bending losses. These are measured firstly by winding the fiber around a sleeve having a diameter of 20 mm, thereby measuring the losses per unit length induced by winding the fiber. Bending losses are also measured by winding 100 turns of the fiber around a sleeve having a diameter of 60 mm, with the value given in this case being expressed in decibels (dB) rather than in decibels per meter (dB/m). The second method is the older method, the first constituting a test that is more discriminating and better for characterizing a fiber. Except for cutoff wavelength and bending losses, the various parameters were measured at 1550 nm. Bending losses were measured at 1625 nm. Insofar as bending losses increase with increasing wavelength, if they present an acceptable value at 1625 nm, then they will also be acceptable for wavelengths shorter than this value.

TABLE 6

| $S_{eff}$ [$\mu m^2$] @ 1550 nm | C [ps/(nm · km)] @ 1550 nm | C' [ps/(nm² · km)] @ 1550 nm | $\lambda_{ceff}$ [nm] | C/C' [nm] @ 1550 nm | $S_{eff}^2/C'$ [$\mu m^4 \cdot nm^2 \cdot km/ps$] @ 1550 nm | PC$\phi$20 mm [dB/m] @ 1625 nm | PC$\phi$60 mm [dB] @ 1625 nm |
|---|---|---|---|---|---|---|---|
| 43 | 0.40 | 0.0246 | <1550 | 16 | 85601 | 44 | 2.9 × 10⁻⁴ |

There follow examples of fibers constituting embodiments of the invention. FIG. 3 is a diagram of the reference index profile for a ten-step fiber. In the diagram of FIG. 3, the index profile of the fiber remains similar to that of FIG. 2, there being a central portion of index greater than that of the cladding, a trench of index less than that of the cladding, followed by a ring of index greater than that of the cladding. Nevertheless, in the central portion, the index in the trench and in the ring varies, instead of presenting a constant value as it does in FIG. 2. In the example of FIG. 3 showing the principles of the invention, the central portion is constituted by three index steps; the buried trench is formed by two index steps; the ring has three index steps; and the second buried trench is constituted by two index steps. The fibers proposed in the examples present various different profiles, in particular having one or more outer steps presenting an index less than that of the cladding.

As shown in FIG. 3, each fiber step has the same thickness. This option simplifies fiber manufacture, since each step can then correspond in manufacturing terms to one (or more) passes of a torch used in making a preform by vapor axial deposition (VAD) or by modified chemical vapor deposition (MCVD).

In the table below, there can be seen the reference profile parameters for various different fibers; given that the steps are all of the same thickness, the table shows only the total radius of the fiber. The thickness of any one step is then obtained by dividing said total radius by the number of steps.

In the first column of the table there thus appears the outside radius a of the second buried trench, expressed in micrometers. Each index step is of a thickness which is substantially equal to the ratio of said outside radius divided by the number of steps. The other columns of the table give the difference between the index of a step and the index of the cladding, multiplied by one thousand ($10^3$). Examples 1a and 2a are six-step fibers; examples 3a and 4a are seven-step fibers; examples 5a and 6a are eight-step fibers; examples 7a and 8a are nine-step fibers; and examples 9a and 10a are ten-step fibers.

it possible to achieve substantial improvements compared with prior art fibers.

By way of example, in the examples 8a and 9a of Table 7, the values of $\Delta n_1$ and $\Delta n_2$ are identical; in this respect it can be considered that together they comprise a single step built up in two (or more) passes in the method of building up the preform, and not two steps. Similarly, the values of $\Delta n_3$ and $\Delta n_4$ are identical, corresponding to a buried trench built up during the method of manufacturing the preform in two (or more) passes. In the example 8a, the profile thus presents:

TABLE 7

| | a [$\mu$m] | $\Delta n_0$ [× $10^3$] | $\Delta n_1$ [× $10^3$] | $\Delta n_2$ [× $10^3$] | $\Delta n_3$ [× $10^3$] | $\Delta n_4$ [× $10^3$] | $\Delta n_5$ [× $10^3$] | $\Delta n_6$ [× $10^3$] | $\Delta n_7$ [× $10^3$] | $\Delta n_8$ [× $10^3$] | $\Delta n_9$ [× $10^3$] |
|---|---|---|---|---|---|---|---|---|---|---|---|
| 1a | 9.82 | 6.3 | 9.5 | −7.0 | −1.3 | 7.2 | −2.1 | | | | |
| 2a | 9.65 | 6.3 | 9.5 | −6.1 | −1.8 | 6.4 | −0.9 | | | | |
| 3a | 11.55 | 6.2 | 9.5 | −7.0 | −1.5 | 5.9 | 2.4 | −4.2 | | | |
| 4a | 11.32 | 6.7 | 9.5 | −7.0 | −0.6 | 4.8 | 2.6 | −3.8 | | | |
| 5a | 13.06 | 6.5 | 9.5 | −7.0 | −0.4 | 5.0 | 1.5 | −0.3 | −3.0 | | |
| 6a | 12.81 | 6.7 | 9.5 | −6.2 | −3.1 | 7.4 | −0.2 | 0.1 | −2.9 | | |
| 7a | 14.21 | 6.7 | 9.5 | −5.4 | −3.2 | 6.5 | 1.4 | −1.9 | 2.5 | −5.4 | |
| 8a | 9.75 | 5.6 | 9.0 | 9.0 | −7.0 | −7.0 | 5.0 | 3.8 | 3.1 | −2.9 | |
| 9a | 10.99 | 4.5 | 9.0 | 9.0 | −7.0 | −7.0 | 5.3 | 2.1 | 3.7 | 2.4 | −5.4 |
| 10a | 10.86 | 7.0 | 8.5 | 8.4 | −6.4 | −7.0 | 6.4 | 0.8 | 3.6 | 1.8 | −3.9 |

In practice, the selected number n of steps where n is an integer between 6 and 10 and the selected thickness for each step as being equal to the ratio of the total thickness of the fiber divided by the number of steps is the solution that is the simplest to implement when manufacturing the fiber using a method in which the various layers forming the preform from which the fiber is to be drawn are made by making successive deposits. It is thus possible to use the MCVD technique or the VAD technique. Those two techniques are well known in the art and they enable fibers to be made that present a profile that is complex, having a large number of steps, as in the examples described.

It is possible to vary the number of steps. In particular, the number of steps could be greater than ten, for example 11 or 12; with these other two numbers it is still possible with the above-mentioned methods to obtain a preform of appropriate size; other numbers of steps could also be selected for use with other methods or in the light of progress in existing methods. It is also possible to obtain steps which do not correspond to a single pass in a deposition method, but which correspond to a plurality of passes. The minimum value of six steps is proposed in the examples since it makes a central portion of index greater than the index of the cladding, with a first step and a second step of thickness that is twice that of the first step;

a buried trench formed by a single step;

a ring of index greater than the index of the cladding, formed by three steps; and a second buried trench formed by a single step.

The fiber can thus be described as presenting seven steps, of differing thicknesses. A step is then defined as a portion of the fiber in which the reference index presents a value that is constant; a step may correspond physically to one or more passes during preform manufacture. It will thus be understood that the number of steps and the sizes of the steps can be varied.

Table 8 gives the optical characteristics of the fibers of Table 7, using the same notation as in Table 6.

TABLE 8

| | $S_{eff}$ [$\mu m^2$] @ 1550 nm | C [ps/(nm · km)] @ 1550 nm | C' [ps/(nm$^2$ · km)] @ 1550 nm | $\lambda_{ceff}$ [nm] | C/C' [nm] @ 1550 nm | $S_{eff}^2$/C' [$\mu m^4$ · nm$^2$ · km/ps] @ 1550 nm | PCφ20 mm [dB/m] @ 1625 nm | PCφ60 mm [dB] @ 1625 nm |
|---|---|---|---|---|---|---|---|---|
| 1a | 50 | 0.98 | 0.0222 | <1550 | 44 | 112388 | 47 | 3.7 × $10^{-4}$ |
| 2a | 50 | 0.96 | 0.0227 | <1550 | 42 | 108333 | 47 | 3.6 × $10^{-4}$ |
| 3a | 51 | 0.79 | 0.0216 | <1550 | 37 | 118722 | 35 | 2.8 × $10^{-4}$ |
| 4a | 48 | 0.53 | 0.0215 | <1550 | 25 | 107297 | 28 | 1.5 × $10^{-4}$ |
| 5a | 49 | 0.36 | 0.0218 | <1550 | 16 | 111445 | 46 | 2.2 × $10^{-4}$ |
| 6a | 49 | 0.41 | 0.0218 | <1550 | 19 | 108435 | 49 | 2.8 × $10^{-4}$ |
| 7a | 49 | 0.15 | 0.0217 | <1550 | 7 | 109115 | 37 | 1.8 × $10^{-4}$ |
| 8a | 47 | 0.46 | 0.0212 | <1550 | 22 | 106337 | 49 | 2.7 × $10^{-5}$ |
| 9a | 50 | 0.26 | 0.0231 | <1550 | 11 | 107663 | 46 | 5.3 × $10^{-4}$ |
| 10a | 47 | 0.19 | 0.0212 | <1550 | 9 | 104198 | 42 | 2.7 × $10^{-4}$ |

The table shows that the various examples of the fiber of the invention present an effective area $S_{eff}$ greater than that of the prior art fiber, chromatic dispersion C that is similar, chromatic dispersion slope C' that is smaller, cutoff wavelength $\lambda_{ceff}$ that is similar, a better ratio of the square of effective area over chromatic dispersion slope, and bending losses that are similar.

Comparison shows that the fiber of the invention presents optical characteristics that, from the propagation point of view, are better than those of the prior art fiber. This is due in particular to better optimization of the fiber by selecting a larger number of steps. The various chromatic dispersion values show that the fiber of the invention can be adapted to different utilizations, as a function of the desired chromatic dispersion.

A third embodiment of the invention is described below. Consideration is given initially to a prior art fiber which corresponds to example B in French patent application FR-A-00/02316. The fiber presents a reference index profile similar to that of FIG. 2, and the description below uses the same notation as is used above.

Table 9 below shows the characteristics of the prior art fiber, using the same notation as in Table 5.

TABLE 9

| $a_0$ [$\mu$m] | $a_1$ [$\mu$m] | $a_2$ [$\mu$m] | $\Delta n_0$ [$\times 10^3$] | $\Delta n_1$ [$\times 10^3$] | $\Delta n_2$ [$\times 10^3$] |
|---|---|---|---|---|---|
| 3.56 | 5.74 | 10.94 | 7.1 | −6.4 | 1.1 |

With this profile, the prior art fiber presents the propagation characteristics given in Table 10, using the same notation as in Table 6.

TABLE 10

| $S_{eff}$ [$\mu m^2$] @ 1550 nm | C [ps/(nm · km)] @ 1550 nm | C' [ps/(nm$^2$ · km)] @ 1550 nm | $\lambda_{ceff}$ [nm] | C/C' [nm] @ 1550 nm | $S_{eff}^2$/C' [$\mu m^4$ · nm$^2$ · km/ps] @ 1550 nm | PCϕ20 mm [dB/m] @ 1625 nm | PCϕ60 mm [dB] @ 1625 nm |
|---|---|---|---|---|---|---|---|
| 51 | 8.0 | 0.032 | <1550 | 250 | 81250 | 40 | <10$^{-3}$ |

Table 11 is analogous to Table 7 and shows possible index values for various fibers of the invention, using the same notation; this table has three eight-step examples, three nine-step examples, and four examples with ten steps.

TABLE 11

| | a [$\mu$m] | $\Delta n_0$ [$\times 10^3$] | $\Delta n_1$ [$\times 10^3$] | $\Delta n_2$ [$\times 10^3$] | $\Delta n_3$ [$\times 10^3$] | $\Delta n_4$ [$\times 10^3$] | $\Delta n_5$ [$\times 10^3$] | $\Delta n_6$ [$\times 10^3$] | $\Delta n_7$ [$\times 10^3$] | $\Delta n_8$ [$\times 10^3$] | $\Delta n_9$ [$\times 10^3$] |
|---|---|---|---|---|---|---|---|---|---|---|---|
| 1b | 11.55 | 5.7 | 8.0 | −7.0 | −1.1 | 5.7 | −1.4 | | | | |
| 2b | 12.12 | 5.4 | 7.7 | −7.0 | 0.2 | 6.4 | −2.9 | | | | |
| 3b | 12.90 | 5.4 | 8.5 | −5.2 | −7.0 | 7.7 | 2.6 | −5.2 | | | |
| 4b | 8.94 | 5.6 | 6.8 | 8.5 | −6.9 | −7.0 | 3.6 | 4.9 | | | |
| 5b | 15.70 | 5.0 | 8.4 | −7.0 | −1.2 | 5.2 | 1.1 | 0.6 | −4.8 | | |
| 6b | 16.34 | 5.0 | 7.9 | −7.0 | 1.1 | 3.5 | 1.8 | 0.7 | −7.0 | | |
| 7b | 15.93 | 5.2 | 8.1 | −7.0 | 0.4 | 3.5 | 2.7 | −0.7 | −4.9 | | |
| 8b | 18.00 | 4.2 | 8.5 | −6.9 | −0.9 | 4.9 | 0.3 | 2.4 | −3.1 | −5.9 | |
| 9b | 15.91 | 5.3 | 8.5 | −2.6 | −7.0 | 4.3 | 3.6 | 3.0 | −5.7 | −5.4 | |
| 10b | 8.61 | 6.3 | 5.8 | 7.7 | 8.5 | −7.0 | −6.9 | 6.1 | 5.9 | 6.4 | |
| 11b | 20.00 | 4.4 | 8.5 | −7.0 | 0.2 | 4.0 | 1.0 | 1.6 | −2.1 | −4.9 | −7.0 |
| 12b | 13.48 | 2.9 | 7.7 | 7.5 | −7.0 | −6.9 | 3.8 | 2.8 | 6.4 | −2.6 | −4.2 |
| 13b | 18.00 | 4.5 | 8.5 | −2.2 | −7.0 | 6.4 | 0.5 | 4.0 | −2.7 | −4.5 | −5.4 |
| 14b | 13.20 | 4.0 | 7.7 | 7.6 | −6.9 | −7.0 | 3.8 | 2.8 | 6.2 | −2.4 | 3.6 |

Table 12 is similar to Table 8 and uses the same notation; it gives the optical characteristics of the fibers of Table 11.

TABLE 12

| | $S_{eff}$ [$\mu m^2$] @ 1550 nm | C [ps/(nm · km)] @ 1550 nm | C' [ps/(nm$^2$ · km)] @ 1550 nm | $\lambda_{ceff}$ [nm] | C/C' [nm] @ 1550 nm | $S_{eff}^2$/C' [$\mu m^4$ · nm$^2$ · km/ps] @ 1550 nm | PCϕ20 mm [dB/m] @ 1625 nm | PCϕ60 mm [dB] @ 1625 nm |
|---|---|---|---|---|---|---|---|---|
| 1b | 54 | 8.3 | 0.0233 | <1550 | 356 | 125660 | 38 | 2.0 × 10$^{-4}$ |
| 2b | 61 | 8.4 | 0.0286 | <1550 | 294 | 127071 | 42 | 1.3 × 10$^{-4}$ |
| 3b | 54 | 8.2 | 0.0223 | <1550 | 367 | 132268 | 29 | 1.5 × 10$^{-4}$ |
| 4b | 54 | 8.4 | 0.0227 | <1550 | 370 | 126800 | 43 | 1.5 × 10$^{-4}$ |
| 5b | 58 | 8.0 | 0.0224 | <1550 | 357 | 149920 | 40 | 1.0 × 10$^{-4}$ |
| 6b | 62 | 8.1 | 0.0257 | <1550 | 315 | 149282 | 42 | 1.2 × 10$^{-4}$ |
| 7b | 59 | 8.0 | 0.0236 | <1550 | 339 | 147200 | 37 | 8.5 × 10$^{-5}$ |
| 8b | 62 | 7.7 | 0.0246 | <1550 | 321 | 156714 | 18 | 1.1 × 10$^{-4}$ |
| 9b | 55 | 7.8 | 0.0228 | <1550 | 342 | 133497 | 14 | 4.2 × 10$^{-5}$ |
| 10b | 54 | 8.3 | 0.0224 | <1550 | 371 | 127875 | 44 | 1.6 × 10$^{-4}$ |
| 11b | 62 | 7.5 | 0.0251 | <1550 | 299 | 153048 | 9 | 2.7 × 10$^{-5}$ |
| 12b | 60 | 8.1 | 0.0248 | <1550 | 327 | 145500 | 21 | 4.6 × 10$^{-4}$ |
| 13b | 60 | 7.7 | 0.0275 | <1550 | 280 | 132180 | 15 | 5.6 × 10$^{-5}$ |
| 14b | 57 | 7.9 | 0.0220 | <1550 | 360 | 146750 | 45 | 1.6 × 10$^{-4}$ |

As in the preceding examples, it can be seen that compared with the prior art fiber used for comparison purposes, the fiber of the invention presents greater effective area $S_{eff}$, smaller chromatic dispersion slope C', and above all a better ratio of the square of effective area over chromatic dispersion slope.

Tables 13 to 16 propose further examples of fibers of the invention having different profiles; the notation is the same as in the preceding tables. The corresponding fibers present values of chromatic dispersion that are close respectively to 5 ps/(nm.km) and to 10 ps/(nm.km). The propagation characteristics of fibers presenting the referenced profile of Table 13 are given in Table 14, and the propagation characteristics of fibers presenting the reference profile of Table 15 are given in Table 16.

optimized are the index values and the radii of the various steps; the starting values are the values that correspond to the prior art profile, as mentioned above. The optimization parameter may be a scalar or a vector and it is a function of the propagation characteristics of the fiber. In particular, the optimization parameter can be the ratio of the square of effective area over chromatic dispersion slope. It is also possible to limit index gradient by imposing a maximum limit on differences between the indices of two steps in a given zone of the fiber; for example, a limit may be imposed in the core zone of the fiber, or in the buried trench zone. Clearly such a limit is less than the overall variation of index in the fiber, and for example less than the variation in index between a positive index step and an adjacent negative index step.

TABLE 13

| a [μm] | $\Delta n_0$ [× 10³] | $\Delta n_1$ [× 10³] | $\Delta n_2$ [× 10³] | $\Delta n_3$ [× 10³] | $\Delta n_4$ [× 10³] | $\Delta n_5$ [× 10³] | $\Delta n_6$ [× 10³] | $\Delta n_7$ [× 10³] | $\Delta n_8$ [× 10³] | $\Delta n_9$ [× 10³] |
|---|---|---|---|---|---|---|---|---|---|---|
| 6T | 8.09 | 5.5 | 8.5 | 4.2 | −7.0 | −2.3 | 8.5 | | | | |
| 8T | 14.84 | 5.4 | 8.5 | −7.0 | 2.8 | 2.6 | 1.3 | 2.6 | −4.6 | | |
| 10T | 9.41 | −4.1 | 8.4 | 8.5 | 8.4 | −6.9 | −7.0 | −2.5 | 6.8 | 2.1 | 3.5 |

TABLE 14

| | $S_{eff}$ [μm²] @ 1550 nm | C [ps/(nm · km)] @ 1550 nm | C' [ps/(nm² · km)] @ 1550 nm | $\lambda_{ceff}$ [nm] | C/C' [nm] @ 1550 nm | $S_{eff}^2$/C' [μm² · nm² · km/ps] @ 1550 nm | PCφ20 mm [dB/m] @ 1625 nm | PCφ60 mm [dB] @ 1625 nm |
|---|---|---|---|---|---|---|---|---|
| 6T | 58 | 5.2 | 0.0310 | <1550 | 168 | 110000 | 48 | 1.7 × 10⁻⁴ |
| 8T | 60 | 5.0 | 0.0281 | <1550 | 178 | 128110 | 34 | 9.3 × 10⁻⁵ |
| 10T | 60 | 5.0 | 0.0283 | <1550 | 177 | 127200 | 47 | 1.7 × 10⁻⁴ |

TABLE 15

| a [μm] | $\Delta n_0$ [× 10³] | $\Delta n_1$ [× 10³] | $\Delta n_2$ [× 10³] | $\Delta n_3$ [× 10³] | $\Delta n_4$ [× 10³] | $\Delta n_5$ [× 10³] | $\Delta n_6$ [× 10³] | $\Delta n_7$ [× 10³] | $\Delta n_8$ [× 10³] | $\Delta n_9$ [× 10³] |
|---|---|---|---|---|---|---|---|---|---|---|
| 6T | 12.02 | 4.9 | 8.3 | −7.0 | 0.1 | 5.6 | −1.6 | | | | |
| 8T | 15.71 | 4.6 | 8.5 | −7.0 | 1.9 | 1.7 | 1.4 | 2.2 | −2.9 | | |
| 10T | 9.80 | 3.0 | 5.4 | 8.5 | 8.4 | −6.9 | −7.0 | −5.5 | 8.1 | 4.0 | 7.2 |

TABLE 16

| | $S_{eff}$ [μm²] @ 1550 nm | C [ps/(nm · km)] @ 1550 nm | C' [ps/(nm² · km)] @ 1550 nm | $\lambda_{ceff}$ [nm] | C/C' [nm] @ 1550 nm | $S_{eff}^2$/C' [μm² · nm² · km/ps] @ 1550 nm | PCφ20 mm [dB/m] @ 1625 nm | PCφ60 mm [dB] @ 1625 nm |
|---|---|---|---|---|---|---|---|---|
| 6T | 60 | 10.0 | 0.0284 | <1550 | 352 | 126760 | 38 | 1.2 × 10⁻⁴ |
| 8T | 60 | 10.0 | 0.0280 | <1550 | 357 | 128570 | 34 | 9.8 × 10⁻⁵ |
| 10T | 60 | 10.0 | 0.0282 | <1550 | 354 | 127600 | 38 | 1.3 × 10⁻⁴ |

Thus, the various examples proposed show that the invention makes it possible to improve the characteristics of prior art fibers merely by simple and judicious use of the options available in preform manufacturing technology.

To implement the invention, it is possible to proceed as follows. The starting point is a reference profile for a prior art fiber—for example a three-step fiber, as mentioned above. Starting from that fiber, a number of steps is set that is greater than or equal to six; at this stage, it is also appropriate to allocate the steps generally in line with the profile of the prior art fiber. Thereafter, the index values for the various steps are varied, starting from initial values. This can be done using an optimization program; the values to be Optimization can be implemented using optimization tools based on optimization algorithms that are themselves known: simplex, conjugate gradients, quasi-Newton, and genetic algorithm. The initial values are selected starting from the prior art fibers used by way of comparison, splitting up the prior art profile into a plurality of same-thickness steps. The optimization parameter is the ratio of the square of effective area over chromatic dispersion slope.

In all cases, the fiber presents positive chromatic dispersion at a wavelength of 1550 nm; this makes it possible to use it as a line fiber in an optical fiber transmission system. It is also advantageous for the fiber to present, at a wavelength of 1550 nm, a chromatic dispersion slope value that is less than or equal to 0.08 ps/(nm$^2$.km). The limit on chromatic dispersion slope ensures good performance from a system point of view and guarantees little variation in dispersion over a broad spectrum band.

The examples contained in Tables 7–8 (0<C<1 ps/(nm.km)) and 11–12 (C~8 ps/(nm.km)) satisfy these constraints on chromatic dispersion and on chromatic dispersion slope. In Tables 7 and 8, the fiber presents low chromatic dispersion—as in the prior art fiber of Tables 5 and 6; this corresponds to fibers that are optimized for dispersion-managed solitons that are used for long distance transmission, e.g. undersea transmission. In contrast, chromatic dispersion close to 8 ps/(nm.km), as for the fibers in Tables 9 to 12, corresponds to optimization for transmission at 40 Gbit/s.

It is also advantageous for chromatic dispersion at 1550 nm to be less than 14 ps/(nm.km). Above this limit, it is just as easy to manufacture a single mode fiber (SMF).

The fiber of the invention may advantageously be used as a line fiber in a transmission system.

Naturally, the invention is not limited to the embodiments described in detail. In particular the number of steps may vary. During optimization, it is not essential to start from a prior art fiber; that solution has the advantage of accelerating optimization, but it is also possible to start from identical index values for all of the steps.

What is claimed is:

1. An optical fiber presenting a reference index profile having six or more steps and positive chromatic dispersion at a wavelength of 1550 nm, wherein the optical fiber presents, for a wavelength of 1550 nm, a ratio of the square of effective area over chromatic dispersion slope greater than 100,000 $\mu$m$^4$.nm$^2$.km/ps.

2. The fiber of claim 1, wherein the optical fiber presents, for a wavelength of 1550 nm, chromatic dispersion slop less than or equal to 0.08 ps/(nm$^2$.km).

3. The fiber of claim 1, wherein the optical fiber presents, for a wavelength of 1550 nm, chromatic dispersion less than or equal to 14 ps/(nm.km).

4. The fiber of claim 1, wherein the steps are of identical thickness.

5. The fiber of claim 1, wherein at least two steps are of a different thickness.

6. An optical fiber transmission system presenting at least one section of line fiber using the fiber according to claim 1.

* * * * *